US012136779B2

(12) United States Patent
Miyamura et al.

(10) Patent No.: US 12,136,779 B2
(45) Date of Patent: Nov. 5, 2024

(54) CARD EDGE CONNECTOR PREVENTING A REDUCTION IN CONNECTION RELIABILITY

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tetsuya Miyamura, Mie (JP); Yutaka Kobayashi, Mie (JP); Daisuke Saito, Mie (JP); Masanori Moriyasu, Mie (JP); Shinji Tanaka, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 345 days.

(21) Appl. No.: 17/781,038

(22) PCT Filed: Nov. 11, 2020

(86) PCT No.: PCT/JP2020/042029
§ 371 (c)(1),
(2) Date: May 30, 2022

(87) PCT Pub. No.: WO2021/111829
PCT Pub. Date: Jun. 10, 2021

(65) Prior Publication Data
US 2023/0006383 A1 Jan. 5, 2023

(30) Foreign Application Priority Data
Dec. 2, 2019 (JP) ................................ 2019-217845

(51) Int. Cl.
*H01R 12/72* (2011.01)
*H01R 13/24* (2006.01)
(Continued)

(52) U.S. Cl.
CPC ....... *H01R 12/721* (2013.01); *H01R 13/2407* (2013.01); *H01R 13/516* (2013.01); *H01R 13/629* (2013.01); *H01R 13/64* (2013.01)

(58) Field of Classification Search
CPC ......................... H01R 12/721; H01R 13/2407; H01R 13/516; H01R 13/629; H01R 13/64; H01R 12/87; H01R 13/4364; H01R 13/2442
See application file for complete search history.

(56) References Cited

U.S. PATENT DOCUMENTS 4,669,795 A 6/1987 Bonhomme
4,894,022 A * 1/1990 Guckenheimer ...... H01R 12/87 439/71
(Continued)

FOREIGN PATENT DOCUMENTS

JP S57-127490 U1 8/1982
JP H03-086581 U1 9/1991
JP 2014-182901 A 9/2014

OTHER PUBLICATIONS

International Search Report issued on Jan. 12, 2021 for WO 2021/111829 A1 (5 pages).

*Primary Examiner* — Travis S Chambers
(74) *Attorney, Agent, or Firm* — Venjuris, P.C.

(57) ABSTRACT

A card edge connector includes: a housing including a board accommodation space and a connection terminal including a resilient contact piece configured to contact a circuit board inserted into the board accommodation space, the connection terminal being mounted into the housing. The connection terminal is movable between a connection position where the resilient contact piece is in contact with a surface
(Continued)

of the circuit board and a retraction position where the resilient contact piece is separated from the circuit board. A first interference preventing portion and a second interference preventing portion are formed between a moving path of the resilient contact piece and the board accommodation space. The first interference preventing portion and the second interference preventing portion restrict the interference of the resilient contact piece and an inserting end part of the circuit board inserted into the board accommodation space in a moving process of the connection terminal.

5 Claims, 7 Drawing Sheets

(51) Int. Cl.

| | |
|---|---|
| ***H01R 13/516*** | (2006.01) |
| ***H01R 13/629*** | (2006.01) |
| ***H01R 13/64*** | (2006.01) |

(56) References Cited

U.S. PATENT DOCUMENTS

| | | | | |
|---|---|---|---|---|
| 5,722,845 | A * | 3/1998 | Debortoli ............... | H01R 12/88 439/267 |
| 2014/0357136 | A1 | 12/2014 | Duenkel et al. | |
| 2017/0117647 | A1 | 4/2017 | Mizuguchi | |
| 2023/0130722 | A1 * | 4/2023 | Lang .................... | H01R 13/639 439/629 |

* cited by examiner

CARD EDGE CONNECTOR PREVENTING A REDUCTION IN CONNECTION RELIABILITY

CROSS REFERENCE TO RELATED APPLICATIONS

This application is a national phase of PCT application No. PCT/JP2020/042029, filed on 11 Nov. 2020, which claims priority from Japanese patent application No. 2019-217845, filed on 2 Dec. 2019, all of which are incorporated herein by reference.

TECHNICAL FIELD

The present disclosure relates to a card edge connector.

BACKGROUND

Patent Document 1 discloses a board connection connector in which terminals are accommodated in a terminal accommodating member. The terminal accommodating member is formed with a slit-like board insertion portion for accommodating a board. The terminal includes a contact portion projecting from the outer surface of the terminal, and this contact portion resiliently contacts the board inserted into the board insertion portion.

PRIOR ART DOCUMENT

Patent Document

Patent Document 1: JP 2017-084570 A

SUMMARY OF THE INVENTION

Problems to be Solved

When the board is inserted into the board insertion portion, the contact portions of the terminals are waiting on standby while projecting into the board insertion portion. Thus, in the process of inserting the board into the board insertion portion, the contact portions may be plastically deformed or damaged by an inserting end part of the board. If the contact portions are plastically deformed or damaged, connection reliability with the board is reduced.

A card edge connector of the present disclosure was completed on the basis of the above situation and aims to prevent a reduction in connection reliability.

Means to Solve the Problem

The present disclosure is directed to a card edge connector with a housing including a board accommodation space, a circuit board being inserted into the board accommodation space, and a connection terminal including a resilient contact piece configured to contact the circuit board inserted into the board accommodation space, the connection terminal being mounted into the housing, wherein the connection terminal mounted in the housing is movable between a connection position where the resilient contact piece is in contact with a surface of the circuit board inserted into the board accommodation space and a retraction position where the resilient contact piece is separated from the circuit board, an interference preventing portion is formed between a moving path of the resilient contact piece and the board accommodation space, and the interference preventing portion restricts the interference of the resilient contact piece and an inserting end part of the circuit board inserted into the board accommodation space in a moving process of the connection terminal.

Effect of the Invention

According to the present disclosure, it is possible to prevent a reduction in connection reliability.

DETAILED DESCRIPTION TO EXECUTE THE INVENTION

Description of Embodiments of Present Disclosure

Figure 1:
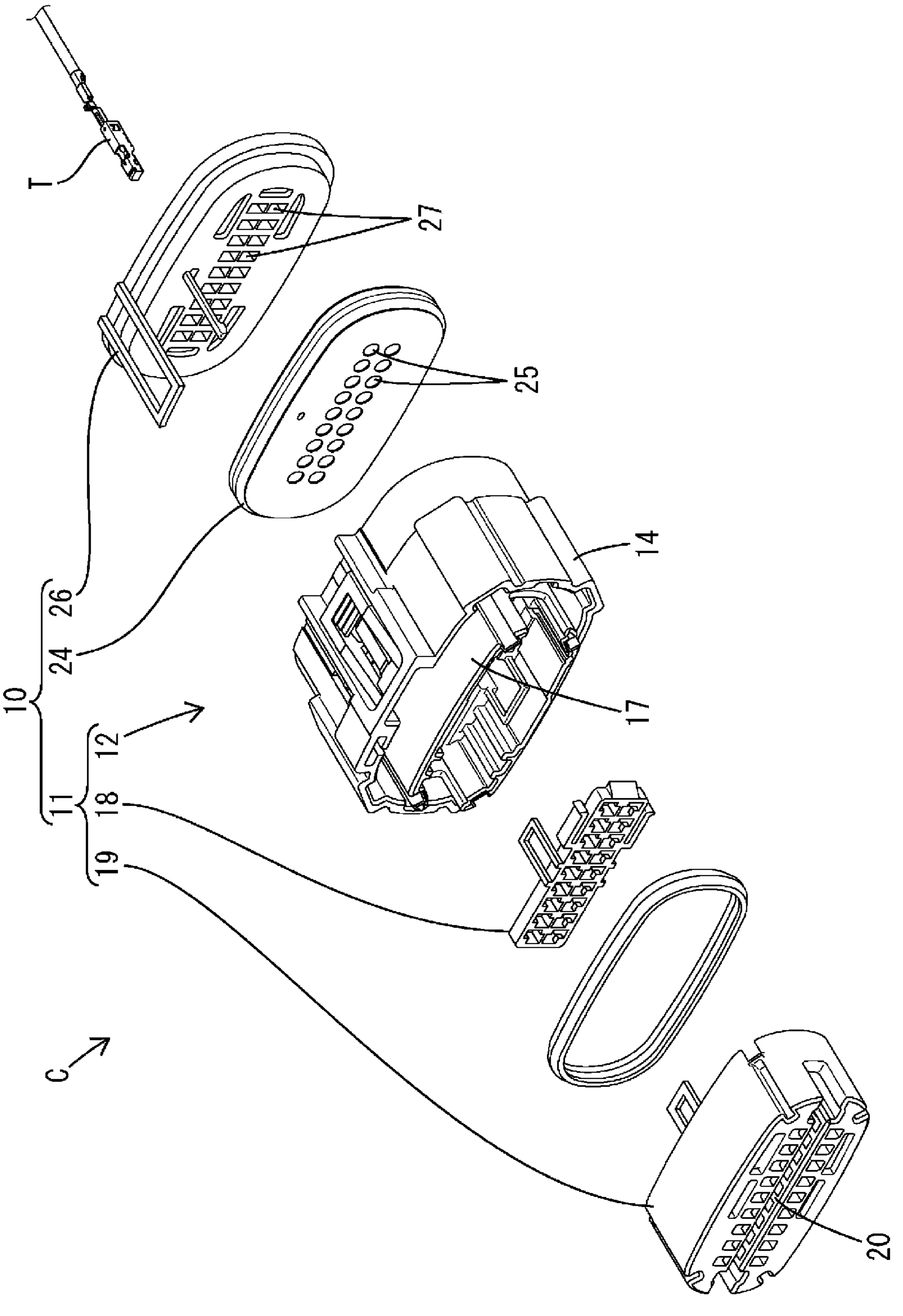
FIG. 1 is an exploded perspective view of a card edge connector.

First, embodiments of the present disclosure are listed and described.

(1) The card edge connector of the present disclosure is provided with a housing including a board accommodation space, a circuit board being inserted into the board accommodation space, and a connection terminal including a resilient contact piece configured to contact the circuit board inserted into the board accommodation space, the connection terminal being mounted into the housing, wherein the connection terminal mounted in the housing is movable between a connection position where the resilient contact piece is in contact with a surface of the circuit board inserted into the board accommodation space and a retraction position where the resilient contact piece is separated from the circuit board, an interference preventing portion is formed between a moving path of the resilient contact piece and the board accommodation space, and the interference preventing portion restricts the interference of the resilient contact piece and an inserting end part of the circuit board inserted into the board accommodation space in a moving process of the connection terminal. According to the configuration of the present disclosure, the resilient contact piece does not interfere with the inserting end part of the circuit board in the process of moving the connection terminal from the retraction position to the connection position. In this way, the resilient contact piece is not plastically deformed or damaged due to interference with the inserting end part of the circuit board, wherefore a reduction in the connection reliability of the circuit board and the resilient contact piece can be prevented.

(2) Preferably, the interference preventing portion is bent to make a resilient deformation amount of the resilient contact piece at the retraction position less than that of the resilient contact piece at the connection position. According to this configuration, even if a state where the connection terminal is at the retraction position remains for a long period of time, the settling of the resilient contact piece can be avoided.

In (2), preferably, the interference preventing portion has a guide surface inclined with respect to a moving direction of the connection terminal, and the resilient contact piece slides in contact with the guide surface in the process of moving the connection terminal from the retraction position to the connection position. As the connection terminal is moved from the retraction position to the connection position, the resilient deformation amount of the resilient contact piece increases. Since the resilient contact piece slides in contact with the guide surface inclined with respect to the moving direction of the connection terminal during this time, the resilient contact piece is smoothly resiliently deformed.

(4) Preferably, the interference preventing portion holds the connection terminal so that the connection terminal does not move to the connection position by the resilient contact piece contacting the interference preventing portion. According to this configuration, since the interference preventing portion has both a function of preventing the interference of the resilient contact piece and the circuit board and a function of holding the connection terminal at the retraction position, a dedicated part or member for holding the connection terminal at the retraction position is unnecessary.

(5) Preferably, a tubular member is provided which is mountable into and removable from the housing and is attached to the connection terminal, the connection terminal is relatively movable with respect to the tubular member between a position where the resilient contact piece is accommodated in the tubular member and a position where the resilient contact piece is exposed to outside of the tubular member, and the interference preventing portion is formed in the tubular member. According to this configuration, the resilient contact piece can be protected from the interference of external matters by the tubular member even if the connection terminal and the tubular member are removed from the housing.

Details of Embodiment of Present Disclosure

Figure 2:
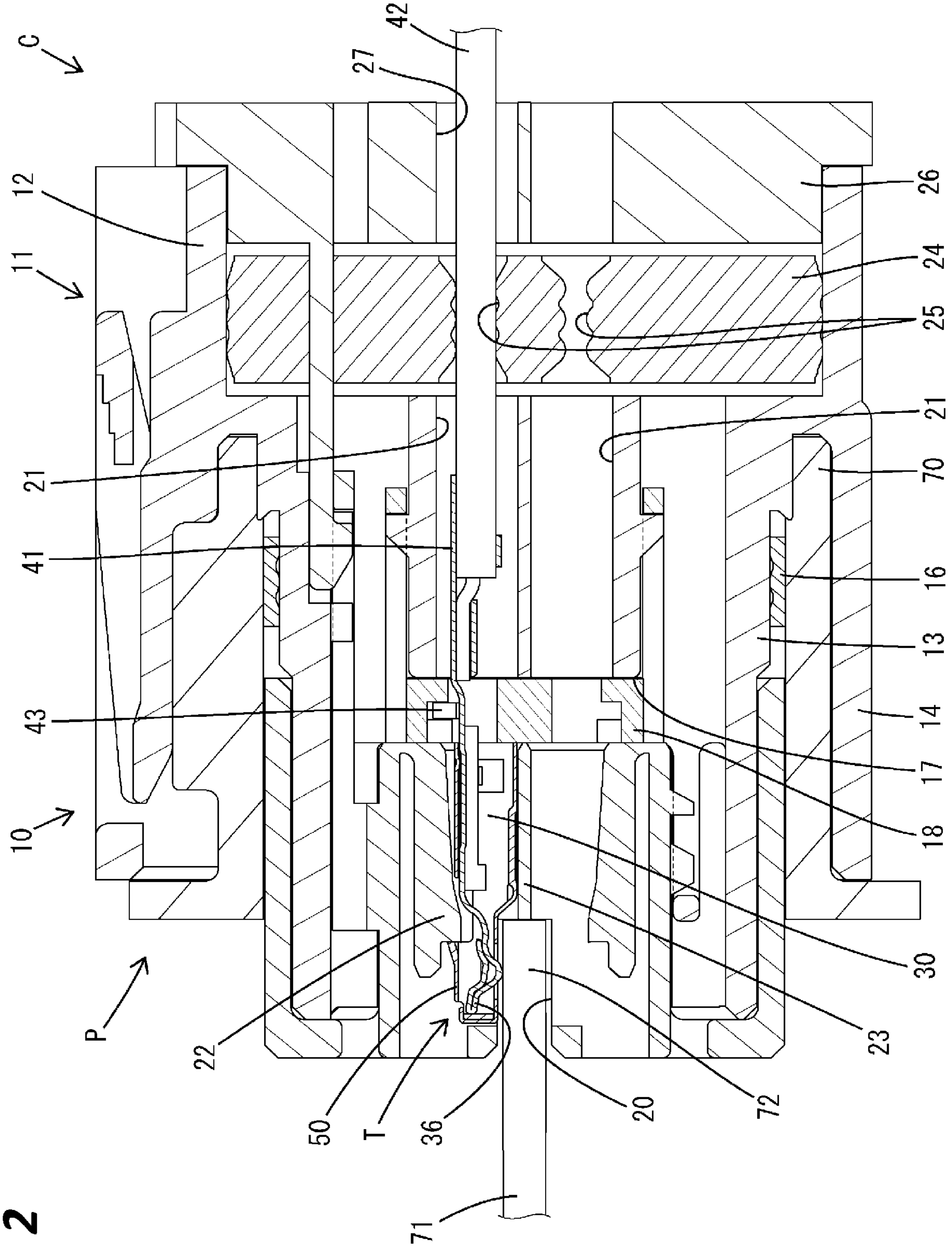
FIG. 2 is a side view in section showing a state where the card edge connector is connected to a board-side connector and a connection terminal is held at a connection position.
Figure 3:
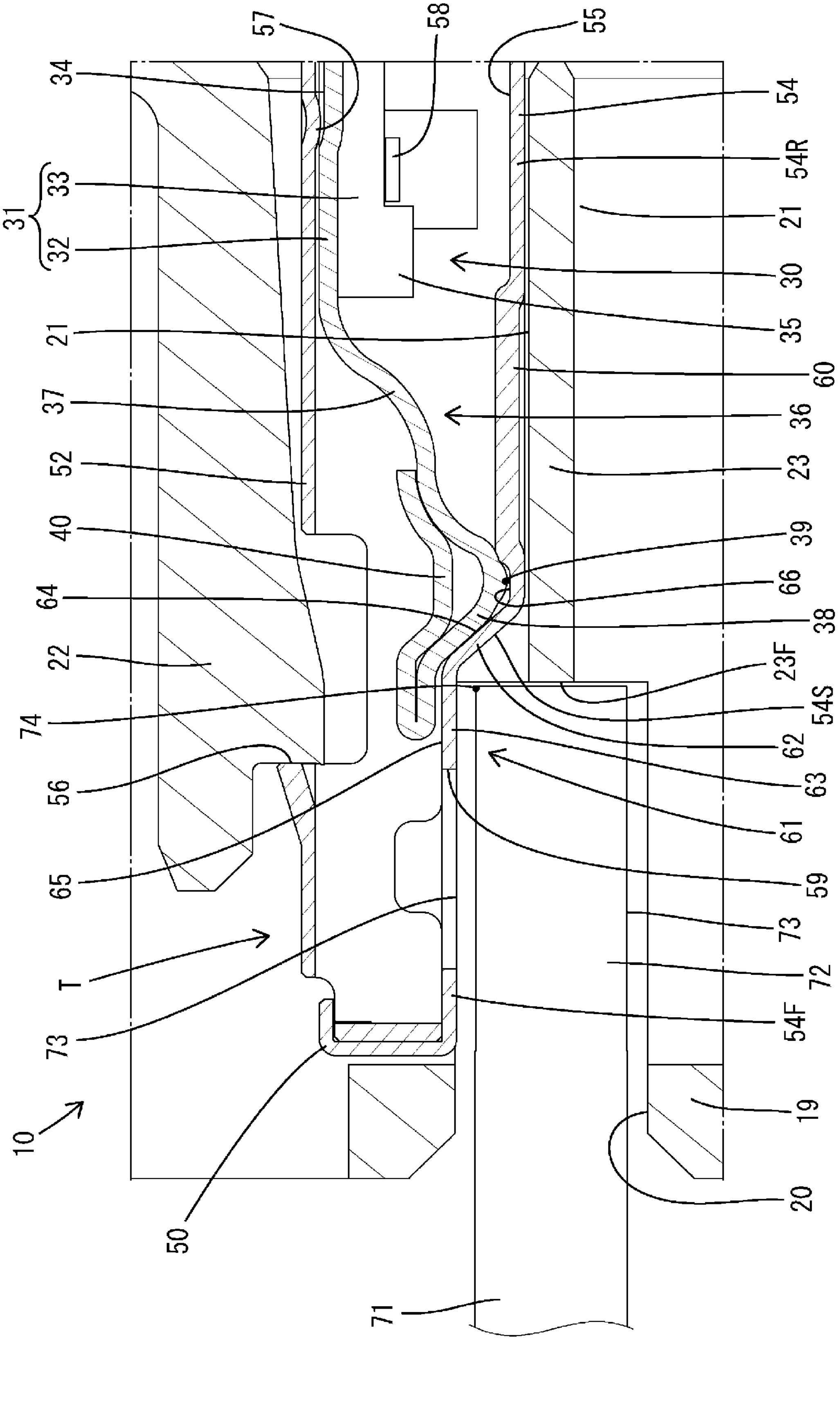
FIG. 3 is a partial enlarged side view in section showing a state where the card edge connector is connected to the board-side connector and the connection terminal is held at a protection position.
Figure 4:
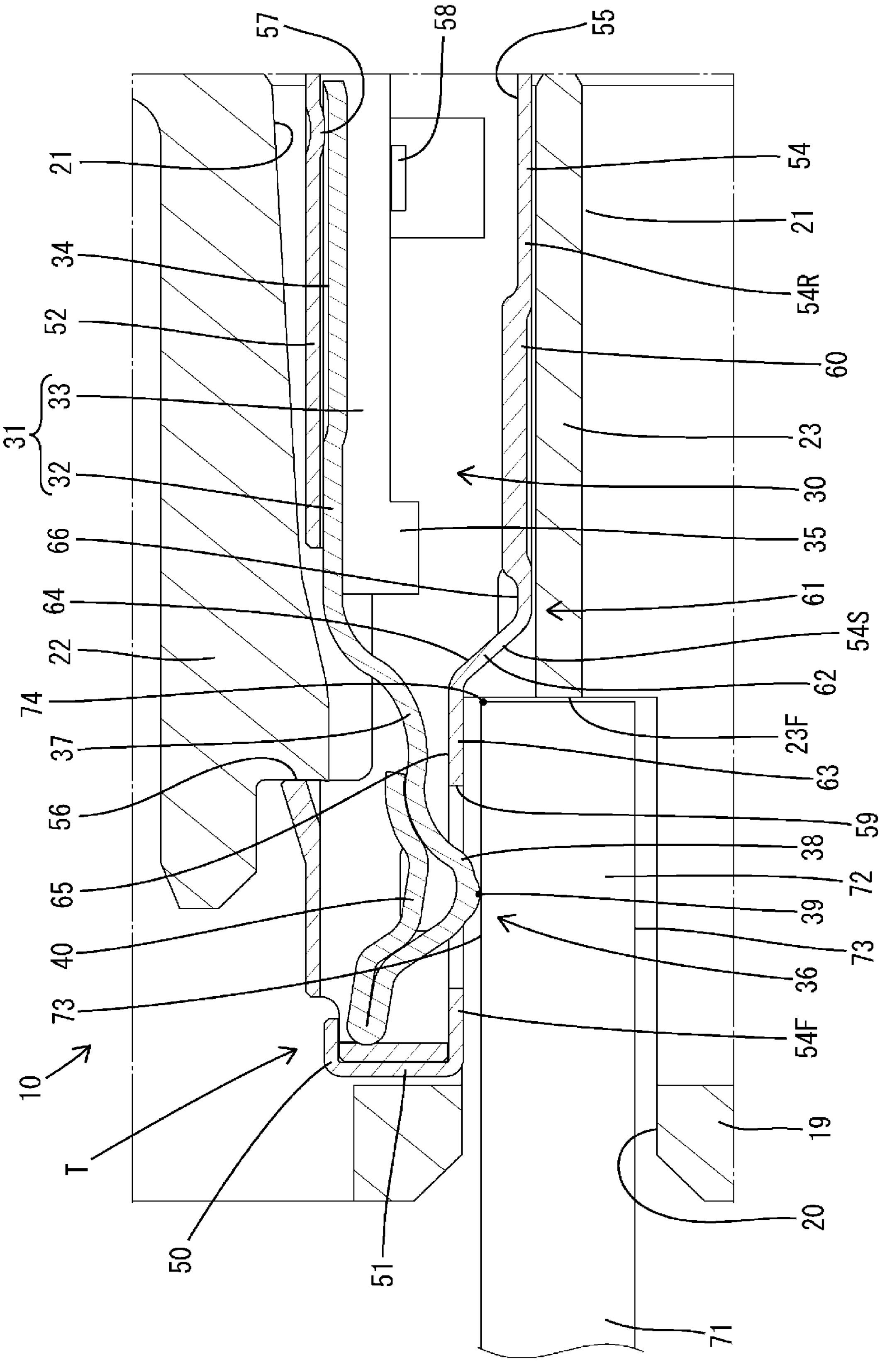
FIG. 4 is a partial enlarged side view in section showing the state where the card edge connector is connected to the board-side connector and the connection terminal is held at the connection position.
Figure 5:
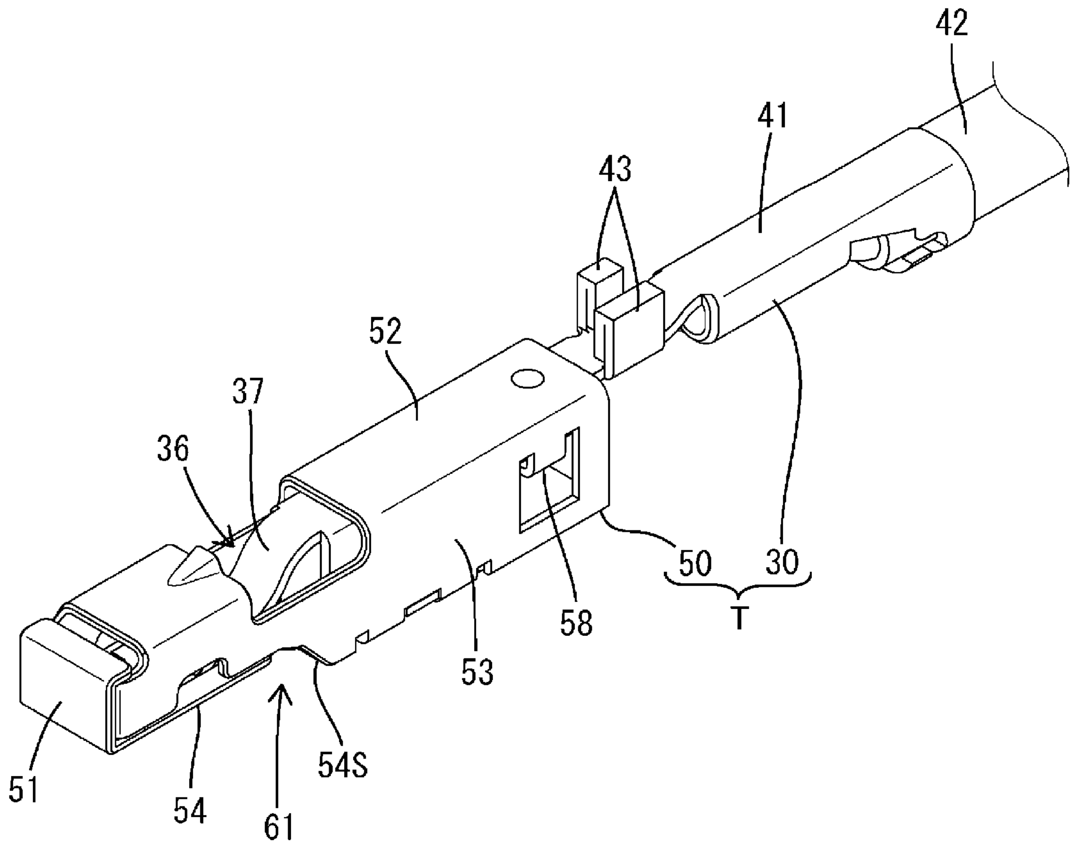
FIG. 5 is a perspective view of a terminal fitting in a state where the connection terminal is held at the connection position.

One specific embodiment of a card edge connector C and terminal fittings T of the present disclosure is described with reference to FIGS. 1 to 7. Note that the present invention is not limited to these illustrations and is intended to be represented by claims and include all changes in the scope of claims and in the meaning and scope of equivalents. In this embodiment, an oblique left lower front side in FIGS. 1 and 5 to 7 and a left side in FIGS. 2 to 4 are defined as a front side concerning a front-rear direction. Upper and lower sides shown in FIGS. 1 to 7 are directly defined as upper and lower sides concerning a vertical direction.

The card edge connector C is connected to a board-side connector P. The board-side connector P includes a receptacle 70 (see FIG. 2) provided on a device (not shown) such as an ECU and a circuit board 71 mounted in the device with a plate thickness direction oriented in the vertical direction. A tip part of the circuit board 71 functions as an inserting end part 72 to be inserted into a board accommodation space 20 to be described later and is surrounded by the receptacle 70. Surfaces, i.e. upper and lower surfaces, of the inserting end part 72 of the circuit board 71 serve as connection surfaces 73 formed with printed circuits (not shown).

As shown in FIG. 1, the card edge connector C is configured by assembling a housing 10 and a plurality of terminal fittings T. Note that only one terminal fitting T is shown in FIG. 1. The housing 10 is configured by assembling a housing body 11, a one-piece rubber plug 24 and a rear holder 26. The housing body 11 is configured by assembling an outer housing 12, an inner housing 19 and a retainer 18.

As shown in FIG. 2, the outer housing 12 is a single component including a terminal accommodating portion 13 and a tubular fitting portion 14. The tubular fitting portion 14 projects forward from a rear end part of the outer periphery of the terminal accommodating portion 13 to surround the terminal accommodating portion 13. When the card edge connector C is connected to the board-side connector P, the receptacle 70 is fit into a connection space between the outer periphery of the terminal accommodating portion 13 and the inner periphery of the tubular fitting portion 14. A gap between the inner peripheral surface of the receptacle 70 and the outer peripheral surface of the terminal accommodating portion 13 is sealed in a liquid-tight manner by a sealing ring 16.

A mounting portion 17 is formed in the terminal accommodating portion 13 by recessing the front surface of the terminal accommodating portion 13. The retainer 18 and the inner housing 19 are accommodated into the mounting portion 17. The retainer 18 is mounted to cover the back end surface of the mounting portion 17. The inner housing 19 is arranged to cover the front surface of the retainer 18 and surround the outer periphery of the mounting portion 17. The sealing ring 16 is mounted on the outer periphery of the terminal accommodating portion 13. One board accommodation space 20 is formed by recessing the front surface of the inner housing 19 inside the housing 10. The board accommodation space 20 is in the form of a slit extending in a lateral direction. When the card edge connector C is connected to the board-side connector P, the inserting end part 72 of the circuit board 71 is inserted into the board accommodation space 20 from front of the housing 10.

A plurality of cavities 21 penetrating through the housing 11 in the front-rear direction are formed inside the housing 10. The plurality of cavities 21 are arranged separately in two upper and lower stages across the board accommodation space 20 and vertically symmetrical. Both a plurality of the cavities 21 in the upper stage and a plurality of the cavities 21 in the lower stage are arranged side by side in a row in the lateral direction, i.e. a direction parallel to a longitudinal direction of the board accommodation space 20. A front end part of each cavity 21 communicates with the board accommodation space 20. A resiliently deformable locking lance 22 is formed on a wall surface of the cavity 21 on a side opposite to the board accommodation space 20 in the vertical direction.

The inner housing 19 includes a partition wall portion 23 partitioning the cavities 21 in the upper stage and those in the lower stage. The partition wall portion 23 is disposed behind the board accommodation space 20 in the front-rear direction parallel to an inserting direction of the circuit board 71 into the board accommodation space 20. A front end surface 23F of the partition wall portion 23 constitutes the back end surface of the board accommodation space 20 and is located rearward of the front ends of the cavities 21. A vertical dimension of the partition wall portion 23 is smaller than that of the board accommodation space 20.

With the inserting end part 72 of the circuit board 71 inserted in the board accommodation space 20, both upper and lower connection surfaces 73 of the circuit board 71 and both upper and lower surfaces of a front end part of the partition wall portion 23 facing the cavities 21 are arranged in a stepped manner in the front-rear direction. In other words, the upper and lower surfaces of the partition wall portion 23 are positioned to be recessed with respect to the connection surfaces 73 of the circuit board 71.

The one-piece rubber plug 24 and the rear holder 26 for preventing the separation of the one-piece rubber plug 24 from the housing body 11 are mounted in a rear end part of the housing body 11. A plurality of sealing holes 25 penetrating through the one-piece rubber plug 24 in the front-rear direction are formed to correspond to the plurality of cavities 21. The rear holder 26 is formed with a plurality of through holes 27 corresponding to the respective sealing holes 25.

The terminal fitting T is configured by assembling a connection terminal 30 made of metal and serving as a single component and a protection terminal 50 separate from the connection terminal 30, made of metal and serving as a single component. In an assembled state, the connection terminal 30 is at least partially accommodated in the protection terminal 50. The connection terminal 30 is relatively movable in the front-rear direction with respect to the protection terminal 50 between a protection position (see FIG. 3) and a connection position (see FIGS. 2 and 4) forward of the protection position.

Figure 6:
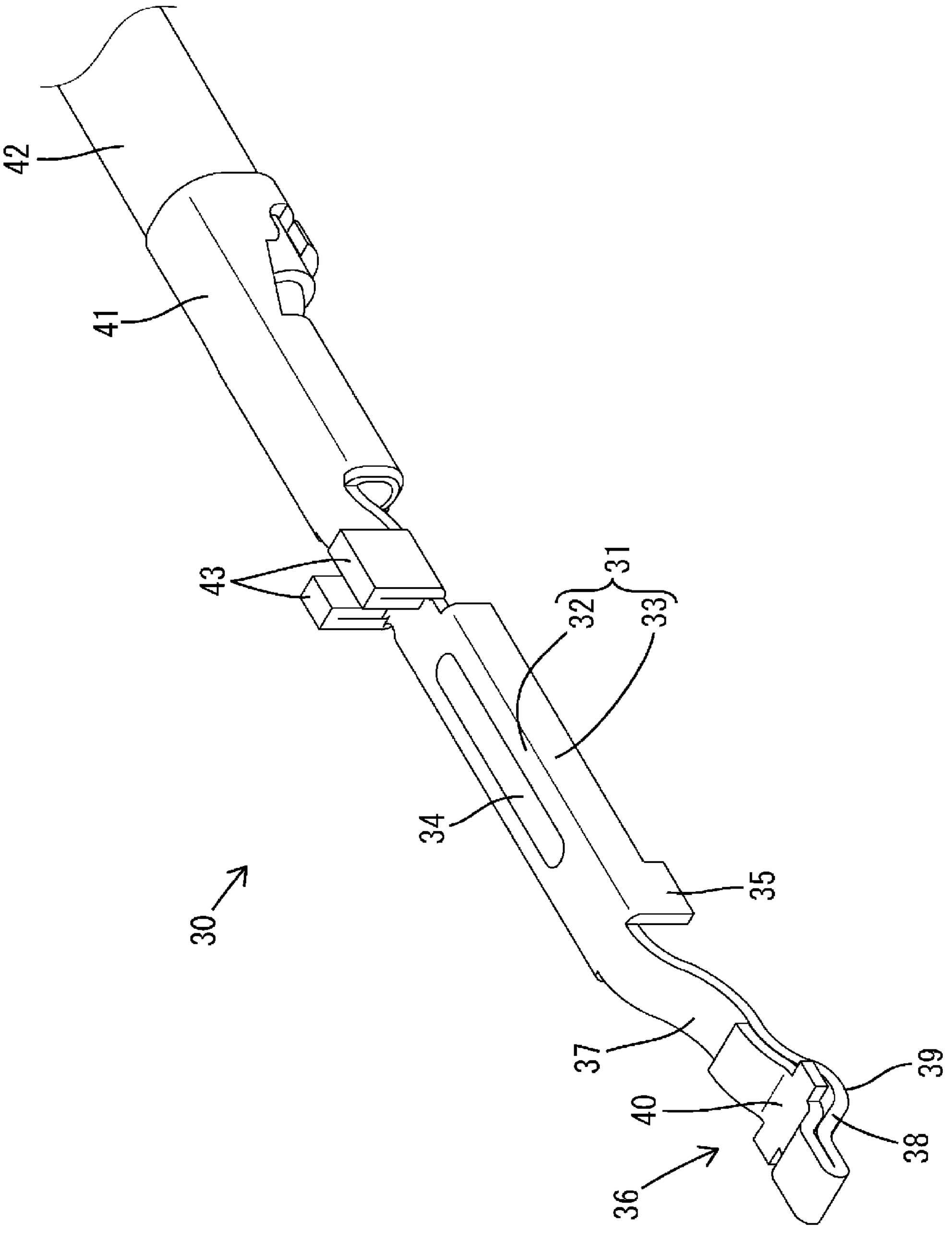
FIG. 6 is a perspective view of the connection terminal.

The connection terminal 30 is formed by bending a metal plate material and, as shown in FIG. 6, shaped to be long in the front-rear direction as a whole. The connection terminal 30 includes a base portion 31 elongated in the front-rear direction, a resilient contact piece 36 cantilevered forward from the front end of the base portion 31 and a crimping portion 41 in the form of an open barrel extending rearward from the rear end of the base portion 31.

The base portion 31 includes a base plate portion 32 having a plate thickness direction oriented in the vertical direction and a pair of left and right side plate portions 33 projecting at a right angle toward an inner surface side (downward) of the base plate portion 32 from both left and right side edges of the base plate portion 32. A guide groove 34 elongated in the front-rear direction is formed in an outer surface of the base plate portion 32, i.e. in a surface on a side opposite to a projecting direction of the side plate portions 33. Retaining portions 35 projecting toward a side opposite to the base plate portion 32 are formed on front end parts of the side plate portions 33.

The resilient contact piece 36 includes an arm portion 37 extending obliquely forward from the front end of the base plate portion 32, a contact portion 38 projecting forward from the front end of the arm portion 37 and a reinforcing portion 40 cantilevered rearward from the front end of the contact portion 38. The arm portion 37 extends in an oblique direction toward the inner surface side (downward) of the base plate portion 32. The contact portion 38 is curved to bulge toward the inner surface side (downward) of the base plate portion 32. A most projecting part of the contact portion 38 serves as a contact point portion 39 to be brought into contact with the circuit board 71.

The reinforcing portion 40 is folded rearward from the front end of the contact portion 38 and overlapped on front and rear end parts of the contact portion 38. The deformation of the contact portion 38 is suppressed by the reinforcing portion 40. The resilient contact piece 36 is configured such that the contact portion 38 and the contact point portion 39 are displaced in a plate thickness direction of the base plate portion 32, i.e. in a direction perpendicular to the connection surfaces 73 of the circuit board 71 by the resilient deformation of the arm portion 37.

The crimping portion 41 includes a barrel portion projecting in the same direction as the projecting direction of the side plate portions 33. A front end part of a wire 42 is conductively fixed to the crimping portion 41. Stabilizers 43 projecting in a direction opposite to the projecting direction of the barrel portion are formed on both left and right edge parts of a front end part of the crimping portion 41.

Figure 7:
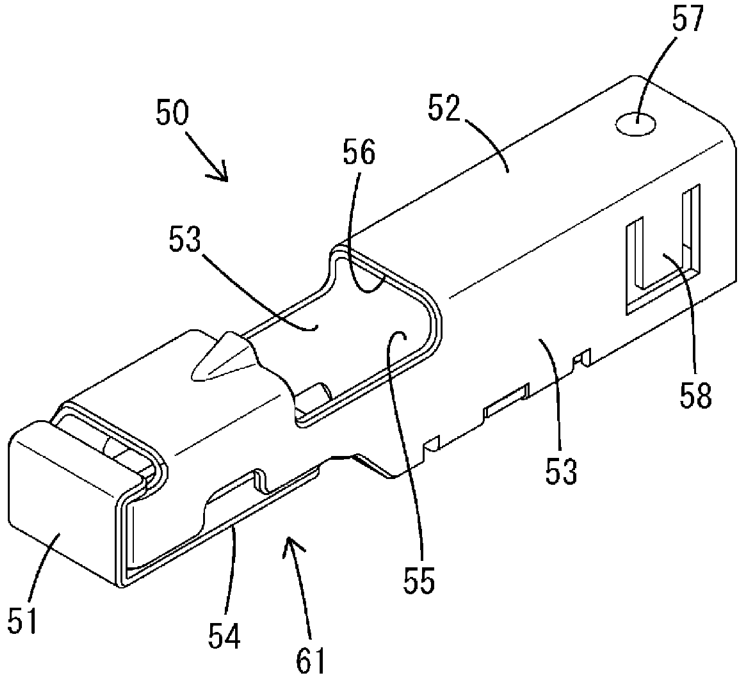
FIG. 7 is a perspective view of a protection terminal.

The protection terminal 50 is formed by bending a metal plate material and, as shown in FIG. 7, in the form of a rectangular tube elongated in the front-rear direction as a whole. The protection terminal 50 functions as a tubular member for surrounding the resilient contact piece 36 of the connection terminal 30. The protection terminal 50 includes a front wall portion 51 having a thickness direction oriented in the front-rear direction, a supporting wall portion 52 having a thickness direction oriented in the vertical direction, a pair of left and right side wall portions 53 having a thickness direction oriented in the lateral direction, and a bottom wall portion 54 having a thickness direction oriented in the vertical direction and facing the supporting wall portion 52. The inside of the protection terminal 50 functions as a protection space 55 for accommodating the resilient contact piece 36 of the connection terminal 30. The front end of the protection space 55 is closed by the front wall portion 51. The rear end of the protection space 55 is open to the outside of the protection terminal 50.

A retaining hole 56 lockingly engageable with the locking lance 22 is formed at a position forward of a center in the front-rear direction of the supporting wall portion 52. A rear end part of the supporting wall portion 52 is struck to form a guide projection 57 projecting toward an inner surface side of the supporting wall portion 52, i.e. toward the bottom wall portion 54. Projections 58 are formed on rear end parts of the both left and right side wall portions 53 by partially cutting the side wall portions 53. The projections 58 project inwardly of the protection terminal 50. In the front-rear direction, the projections 58 are arranged at a position slightly forward of the guide projection 57.

The bottom wall portion 54 includes a front end side region 54F, a rear end side region 54R and an inclined region 54S linking the rear end of the front end side region 54F and the front and of the rear end side region 54R. A vertical spacing between the front end side region 54F and the supporting wall portion 52 is narrower than that between the rear end side region 54R and the supporting wall portion 52. The inclined region 54S is inclined with respect to the front-rear direction, i.e. a relative moving direction of the connection terminal 30 with respect to the protection terminal 50. A rear end part of the front end side region 54F and a front end part of the inclined region 54S are connected at an obtuse angle, and a rear end part of the inclined region 54S and a front end part of the rear end side region 54R are also connected at an obtuse angle.

The front end side region 54F is formed with a connection hole 59 for allowing the resilient contact piece 36 to project outwardly of the protection terminal 50. A thick portion 60 having a larger thickness than the front end side region 54F, the inclined region 54S and the rear end part of the rear end side region MR is formed in a region from a position near a front end to a center in the front-rear direction of the rear end side region MR.

A region of the bottom wall portion 54 from the rear end of the connection hole 59 to the rear end of the thick portion 60 functions as a protecting portion 61. The protecting portion 61 prevents the interference of external matters outside the terminal fitting T with the resilient contact piece 36. The protecting portion 61 includes a first interference preventing portion 62, a second interference preventing portion 63 and the thick portion 60. The first interference preventing portion 62 constitutes the entire inclined region 54S and prevents the resilient contact piece 36 from contacting an edge 74 of the inserting end part 72 of the circuit board 71. The second interference preventing portion 63 is a region of the front end side region 54F behind the connection hole 59, and prevents the resilient contact piece 36 from contacting the edge 74 of the inserting end part 72 of the circuit board 71, similarly to the first interference preventing portion 62.

A first guide surface 64 and a second guide surface 65 are formed on the inner surface of the protection portion 61. The first guide surface 64 is constituted by the entire inner surface of the first interference preventing portion 62. The second guide surface 65 is constituted by the entire inner surface of the second interference preventing portion 63 and connected at an obtuse angle to the front end of the first guide surface 64. The inner surface of the protecting portion 61 is formed with a recess 66. The recess 66 is formed by recessing a part of the inner surface of the protecting portion 61 between a rear end part of the first guide surface 64 and a front end part of the thick portion 60. The recess 66 is not open in the outer surface of the protection terminal 50.

With the connection terminal 30 located at the protection position, the outer surface of the base portion 31 is overlapped on the inner surface of the supporting wall portion 52, the guide projection 57 is fit in the guide groove 34 and the projecting end edges of the side plate portions 33 are in contact with the projections 58 as shown in FIG. 3. The side plate portions 33 are sandwiched between the supporting wall portion 52 and the projections 58, whereby the connection terminal 30 is vertically positioned with respect to the protection terminal 50. The retaining portions 35 of the connection terminal 30 lock the projections 58 from front, thereby restricting rearward separation of the connection terminal 30 from the protection terminal 50. The front surface of the contact portion 38 of the resilient contact piece 36 comes into surface contact with the first guide surface 64 of the protecting portion 61 from behind, whereby the connection terminal 30 is stopped in front by the first interference preventing portion 62 and a movement thereof toward the connection position is restricted. In the above way, the connection terminal 30 is held at the protection position with respect to the protection terminal 50.

With the connection terminal 30 located at the protection position, the entire resilient contact piece 36 is accommodated in the protection space 55 in the protection terminal 50. Since the contact portion 38 is covered by the protecting portion 61 from an outer surface side of the protection terminal 50, external matters (not shown) outside the protection terminal 50 do not interfere with the contact portion 38. Since the contact point portion 39 of the contact portion 38 is located to face the recess 66 in the front-rear direction, the contact point portion 39 does not directly contact the protection terminal 50.

If the connection terminal 30 at the protection position is pushed forward, the connection terminal 30 starts to move toward the connection position. In the process of moving the connection terminal 30 from the protection position to the connection position, the base plate portion 32 slides in contact with the inner surface of the supporting wall portion 52 and the projecting end edges of the side plate portions 33 slide in contact with the projections 58, whereby the connection terminal 30 is restricted from being relatively displaced and inclined in a direction orthogonal to a moving direction with respect to the protection terminal 50.

As the connection terminal 30 moves forward, the contact portion 38 is displaced obliquely forward by being guided by the first guide surface 64 inclined with respect to a pushing direction of the connection terminal 30 and, accompanied by this, the arm portion 37 is resiliently deformed. If the connection terminal 30 moves further forward, the contact portion 38 passes through the first guide surface 64 and is guided by the second guide surface 65. When the connection terminal 30 reaches the connection position, the contact portion 38 reaches a position where the contact portion 38 is exposed to the outside of the terminal fitting T in the connection hole 59.

Next, an assembling procedure of the card edge connector C and a procedure of connecting the card edge connector C to the board-side connector P are described. In assembling the card edge connector C, the terminal fitting T with the connection terminal 30 held at the protection position is inserted into the cavity 21 through the through hole 27 and the sealing hole 25 from behind the housing 10. The terminal fitting T inserted into the cavity 21 is held in a retained state by the locking engagement of the locking lance 22 with the retaining hole 56. An inserting direction of the terminal fitting T into the cavity 21 is a direction parallel to the inserting direction of the circuit board 71 into the board accommodation space 20.

With the terminal fitting T inserted in the cavity 21, the front end side region 54F of the bottom wall portion 54 of the protection terminal 50 is located to face the board accommodation space 20. Since the connection hole 59 is also facing the board accommodation space 20, the protection space 55 of the protection terminal 50 communicates with the board accommodation space 20 via the connection hole 59. After the terminal fitting T is mounted into the housing 10, the inserting end part 72 of the circuit board 71 is inserted into the board accommodation space 20. At this time, since the resilient contact piece 36 of the terminal fitting T is not located in the board accommodation space 20, the inserting end part 72 of the circuit board 71 does not interfere with the resilient contact piece 36. With the inserting end part 72 of the circuit board 71 inserted in the board accommodation space 20, the connection surface 73 of the inserting end part 72 is located to close the connection hole 59. The contact point portion 39 is located in a thickness range of the circuit board 71 in the vertical direction, i.e. in the plate thickness direction of the circuit board 71.

After the circuit board 71 is inserted into the board accommodation space 20, the connection terminal 30 at the protection position is pushed to the connection position. As the connection terminal 30 is moved to the connection position, the contact portion 38 of the resilient contact piece 36 moves to the connection hole 59 while successively contacting the first and second guide surfaces 64, 65. Immediately before the connection terminal 30 reaches the connection position, the contact point portion 39 of the contact portion 38 transfers from the front end of the second guide surface 65 to the connection surface 73 of the circuit board 71. A height difference between the second guide surface 65 and the connection surface 73 is a dimension including at least the plate thickness of the second interference preventing portion 63. When the connection terminal 30 reaches the connection position, the contact point portion 39 resiliently contacts the connection surface 73.

A height of the contact point portion 39 changes from a height in the thickness range of the circuit board 71 to the same height as the connection surface 73 of the circuit board 71 until the contact point portion 39 contacts the connection surface 73 after the connection terminal 30 starts to move to the connection position. The first and second interference preventing portions 62, 63 are interposed between the entire moving path of the contact point portion 38 to the connection hole 59 and the inserting end part 72 of the circuit board 71 inserted in the board accommodation space 20. Therefore, the contact portion 38 does not contact the edge 74 of the inserting end part 72 of the circuit board 71.

In separating the terminal fitting T from the housing 10, the card edge connector C is first separated from the board-side connector P and the circuit board 71 is moved to the outside of the board accommodation space 20. At this time, the edge 74 of the inserting end part 72 of the circuit board 71 does not push the contact portion 38 against a resilient restoring force of the arm portion 37, but the contact portion 38 only slides in contact with the edge 74 retracted forward of the housing 10 due to the resilient restoring force of the arm portion 37. Therefore, the contact portion 38 is not plastically deformed or damaged.

After the circuit board 71 is pulled out from the board accommodation space 20, the locking lance 22 may be disengaged from the retaining hole 56 by a jig (not shown) inserted from front of the housing 10 and the terminal fitting T may be pulled out rearward. After the terminal fitting T is pulled out from the housing 10, the connection terminal 30 is moved from the connection position to the protection position and the resilient contact piece 36 is accommodated in the protection terminal 50.

The terminal fitting T of this embodiment is mounted into the housing 10 having the board accommodation space 20. The terminal fitting T includes the connection terminal 30 having the resilient contact piece 36 to be brought into contact with the circuit board 71 inserted into the board accommodation space 20, and the protection terminal 50 separate from the connection terminal 30 and attached to the connection terminal 30. The connection terminal 30 is movable with respect to the protection terminal 50 between the protection position where the resilient contact piece 36 is accommodated in the protection terminal 50 and the connection position where the resilient contact piece 36 is exposed to the outside of the protection terminal 50 to be contactable with the circuit board 71.

According to this terminal fitting T, in a state removed from the housing 10, the resilient contact piece 36 can be protected from the interference of external matters by moving the connection terminal 30 to the protection position. Thus, it can be avoided that the resilient contact piece 36 is plastically deformed or damaged by interference with external matters. In this way, a reduction in the connection reliability of the resilient contact piece 36 and the circuit board 71 can be prevented.

The protection terminal 50 is formed with the protecting portion 61, with which the resilient contact piece 36 is brought into contact from the inside of the protection terminal 50 when the connection terminal 30 is at the protection position. The protecting portion 61 is formed to hold the connection terminal 30 so that the connection terminal 30 does not move to the connection position by bringing the resilient contact piece 36 into contact with the first interference preventing portion 62. According to this configuration, since the protecting portion 61 has both a function of protecting the resilient contact piece 36 and a function of holding the connection terminal 30 at the protection position, the shape of the connection terminal 30 is simplified.

The protection terminal 50 is formed with the recess 66 for preventing the contact of the contact point portion 39 of the resilient contact piece 36 with the protection terminal 50 when the connection terminal 30 is at the protection position. According to this configuration, the damage of the contact point portion 39 of the resilient contact piece 36 can be prevented when the connection terminal 30 is at the protection position. The protecting portion 61 has the first guide surface 64, with which the contact point portion 38 of the resilient contact piece 36 is brought into surface contact. By the surface contact of the protecting portion 61 and the contact portion 38, the damage of the resilient contact piece 36 by the protecting portion 61 can be prevented.

The protecting portion 61 has the first and second guide surfaces 64, 65, with which the contact portion 38 of the resilient contact piece 36 is brought into sliding contact. In the process of moving the connection terminal 30 from the protection position to the connection position, the resilient contact piece 36 slides in contact with the first and second guide surfaces 64, 65, wherefore the resilient contact piece 36 can move in a path where the resilient contact piece 36 does not interfere with the inserting end part 72 of the circuit board 71 inserted in the board accommodation space 20. In the process of moving the connection terminal 30 from the protection position to the connection position, the resilient contact piece 36 is not plastically deformed or damaged by interference with the inserting end part 72 of the circuit board 71.

The connection terminal 30 is formed with the guide groove 34 parallel to the moving direction of the connection terminal 30 between the connection position and the protection position, and the protection terminal 50 is formed with the guide projection 57 to be brought into sliding contact with the guide groove 34 in the moving process of the connection terminal 30. By the slide contact of the guide groove 34 and the guide projection 57, the connection terminal 30 can be smoothly moved between the connection position and the protection position.

The card edge connector C of this embodiment includes the housing 10 and a plurality of the connection terminals 30 to be mounted into the housing 10. The housing 10 has the board accommodation space 20 into which the circuit board 71 is inserted. The connection terminal 30 includes the resilient contact piece 36 to be brought into contact with the circuit board 71 inserted into the board accommodation space 20. The connection terminal 30 mounted in the housing 10 is movable in the front-rear direction between the connection position and a retraction position with respect to the housing 10. With the connection terminal 30 located at the connection position, the contact point portion 39 of the resilient contact piece 36 contacts the surface (connection surface 73) of the circuit board 71 inserted into the board accommodation space 20. The retraction position is a position equivalent to the protection position in a positional relationship of the connection terminal 30 and the protection terminal 50. With the connection terminal 30 located at the retraction position, the contact portion 38 of the resilient contact piece 36 is retracted to a position separated rearward from the inserting end part 72 of the circuit board 71.

The first and second interference preventing portions 62, 63 are formed between the moving path of the contact portion 38 when the connection terminal 30 moves between the connection position and the retraction position and the board accommodation space 20. The first and second interference preventing portions 62, 63 restrict the interference of the contact portion 38 and the inserting end part 72 of the circuit board 71 inserted into the board accommodation space 20 in the moving process of the connection terminal 30. Therefore, the contact portion 38 is not plastically deformed or damaged due to the interference of the contact portion 38 and the circuit board 71. In this way, a reduction in the connection reliability of the circuit board 71 and the resilient contact piece 36 can be prevented.

The first and second interference preventing portions 62, 63 are so bent as to make a resilient deformation amount of the arm portion 37 of the resilient contact piece 36 at the retraction position less than that of the arm portion 37 of the resilient contact piece 36 at the connection position. According to this configuration, even if a state where the connection terminal 30 is held at the retraction position remains for a long period of time, the settling of the arm portion 37 can be avoided.

The first interference preventing portion 62 has the first guide surface 64 inclined with respect to the moving direction of the connection terminal 30. In the process of moving the connection terminal 30 from the retraction position to the protection position, the contact portion 38 of the resilient contact piece 36 slides in contact with the first guide surface 64. As the connection terminal 30 moves from the retraction position to the connection position, the resilient deformation amount of the arm portion 37 of the resilient contact piece 36 increases. Since the contact portion 38 slides in contact with the first guide surface 64 inclined with respect to the moving direction of the connection terminal 30 during this time, the arm portion 37 is smoothly resiliently deformed and the contact portion 38 smoothly moves.

The first interference preventing portion 62 is formed to hold the connection terminal 30 so that the connection terminal 30 does not move to the connection position by bringing the contact portion 38 of the resilient contact piece 36 into contact with the first interference preventing portion 62. According to this configuration, since the first interference preventing portion 62 has both a function of preventing the interference of the resilient contact piece 36 and the circuit board 71 and a function of holding the connection terminal 30 at the protection position, a dedicate part or member for holding the connection terminal 30 at the protection position is unnecessary.

The card edge connector C includes the protection terminal 50, which is mountable into and removable from the housing 10 and attached to the connection terminal 30. The connection terminal 30 is relatively movable with respect to the protection terminal 50 between a position where the resilient contact piece 36 is accommodated in the protection terminal 50 and a position where the contact portion 38 of the resilient contact piece 36 is exposed to the outside of the protection terminal 50. The first and second interference preventing portions 62, 63 are formed in the protection terminal 50. According to this configuration, even if the connection terminal 30 and the protection terminal 50 are removed from the housing 10, the resilient contact piece 36 can be protected from the interference of external matters by the protection terminal 50.

OTHER EMBODIMENTS

The present invention is not limited to the above described and illustrated embodiment and is represented by claims. The present invention is intended to include all changes in the scope of claims and in the meaning and scope of equivalents and also include the following embodiments.

Although the interference preventing portions are formed in the tubular member in the above embodiment, the interference preventing portions may be formed in the housing.

Although the connection terminal is mounted into the housing via the tubular member in the above embodiment, the connection terminal may be directly mounted into the housing.

Although the interference preventing portions also have the function of holding the connection terminal at the protection position, a dedicated part or member for holding the connection terminal so that the connection terminal does not move to the connection position may be provided separately from the interference preventing portions.

Although the housing is formed by uniting the inner housing and the outer housing in the above embodiment, the housing may be a single component.

List of Reference Numerals

| | |
|---|---|
| C | card edge connector |
| P | board-side connector |
| T | terminal fitting |
| 10 | housing |
| 11 | housing body |
| 12 | outer housing |
| 13 | terminal accommodating portion |
| 14 | tubular fitting portion |
| 16 | sealing ring |
| 17 | mounting portion |
| 18 | retainer |
| 19 | inner housing |
| 20 | board accommodation space |
| 21 | cavity |
| 22 | locking lance |
| 23 | partition wall portion |
| 23F | front end surface of partition wall portion |
| 24 | one-piece rubber plug |
| 25 | sealing hole |
| 26 | rear holder |
| 27 | through hole |
| 30 | connection terminal |
| 31 | base portion |
| 32 | base plate portion |
| 33 | side plate portion |
| 34 | guide groove |
| 35 | retaining portion |
| 36 | resilient contact piece |
| 37 | arm portion |
| 38 | contact portion |
| 39 | contact point portion |
| 40 | reinforcing portion |
| 41 | crimping portion |
| 42 | wire |
| 43 | stabilizer |
| 50 | protection terminal (tubular member) |
| 51 | front wall portion |
| 52 | supporting wall portion |
| 53 | side wall portion |
| 54 | bottom wall portion |
| 54F | front end side region |
| 54R | rear end side region |
| 54S | inclined region |
| 55 | protection space |
| 56 | retaining hole |
| 57 | guide projection |
| 58 | projection |
| 59 | connection hole |
| 60 | thick portion |
| 61 | protecting portion |
| 62 | first interference preventing portion (interference preventing portion) |
| 63 | second interference preventing portion (interference preventing portion) |
| 64 | first guide surface (guide surface) |
| 65 | second guide surface |
| 66 | recess |
| 70 | receptacle |

-continued

| List of Reference Numerals | |
|---|---|
| 71 | circuit board |
| 72 | inserting end part |
| 73 | connection surface |
| 74 | edge |

What is claimed is:

1. A card edge connector, comprising:

a housing including a board accommodation space, a circuit board being inserted into the board accommodation space; and a connection terminal including a resilient contact piece configured to contact the circuit board inserted into the board accommodation space, the connection terminal being mounted into the housing, wherein:

the connection terminal mounted in the housing is movable between a connection position where the resilient contact piece is in contact with a surface of the circuit board inserted into the board accommodation space and a retraction position where the resilient contact piece is separated from the circuit board, the resilient contact piece includes a contact portion configured to contact the circuit board, an interference preventing portion to be contacted by the contact portion is interposed between an entire region of a moving path of the resilient contact piece and an inserting end part of the circuit board inserted in the board accommodation space, the interference preventing portion restricts the interference of the resilient contact piece and the inserting end part of the circuit board inserted into the board accommodation space in a moving process of the connection terminal, and a contact point portion in contact with the circuit board, out of the contact portion, is located within a thickness range of the circuit board in a plate thickness direction of the circuit board with the connection terminal located at the retraction position and the inserting end part of the circuit board inserted in the board accommodation space.

2. The card edge connector of claim 1, wherein the interference preventing portion is bent to make a resilient deformation amount of the resilient contact piece at the retraction position less than that of the resilient contact piece at the connection position.

3. The card edge connector of claim 2, wherein:

the interference preventing portion has a guide surface inclined with respect to a moving direction of the connection terminal, and the resilient contact piece slides in contact with the guide surface while increasing a resilient deformation amount in the process of moving the connection terminal from the retraction position to the connection position.

4. The card edge connector of claim 1, wherein the interference preventing portion holds the connection terminal so that the connection terminal does not move to the connection position by the resilient contact piece contacting the interference preventing portion.

5. A card edge connector, comprising:

a housing including a board accommodation space, a circuit board being inserted into the board accommodation space;

a connection terminal including a resilient contact piece configured to contact the circuit board inserted into the board accommodation space, the connection terminal being mounted into the housing; and a tubular member mountable into and removable from the housing, the tubular member being a component separate from the connection terminal, the tubular member being attached to the connection terminal wherein:

the connection terminal mounted in the housing is movable between a connection position where the resilient contact piece is in contact with a surface of the circuit board inserted into the board accommodation space and a retraction position where the resilient contact piece is separated from the circuit board, the resilient contact piece includes a contact portion configured to contact the circuit board, an interference preventing portion to be contacted by the contact portion is interposed between an entire region of a moving path of the resilient contact piece and an inserting end part of the circuit board inserted in the board accommodation space, the interference preventing portion restricts the interference of the resilient contact piece and the inserting end part of the circuit board inserted into the board accommodation space in a moving process of the connection terminal, the connection terminal is relatively movable with respect to the tubular member between a position where the resilient contact piece is accommodated in the tubular member and a position where the resilient contact piece is exposed to outside of the tubular member, and the interference preventing portion is formed in the tubular member.

* * * * *